(12) United States Patent
Ng et al.

(10) Patent No.: US 9,478,133 B2
(45) Date of Patent: Oct. 25, 2016

(54) MOTOR VEHICLE AND NAVIGATION ARRANGEMENT FOR A MOTOR VEHICLE

(75) Inventors: Brian Ng, San Francisco, CA (US); Daniel Rosario, Santa Cruz, CA (US); Thomas Chan, San Jose, CA (US); Arne Stoschek, Palo Alto, CA (US)

(73) Assignee: VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 11/747,808

(22) Filed: May 11, 2007

(65) Prior Publication Data

US 2008/0065322 A1    Mar. 13, 2008

Related U.S. Application Data

(63) Continuation-in-part of application No. 11/395,705, filed on Mar. 31, 2006, now abandoned.

(60) Provisional application No. 60/800,222, filed on May 11, 2006.

(51) Int. Cl.
*G08G 1/0968* (2006.01)
*G01C 21/36* (2006.01)
*G08G 1/0969* (2006.01)

(52) U.S. Cl.
CPC ......... *G08G 1/0968* (2013.01); *G01C 21/3635* (2013.01); *G01C 21/3638* (2013.01); *G01C 21/3676* (2013.01); *G01C 21/3682* (2013.01); *G08G 1/0969* (2013.01)

(58) Field of Classification Search
CPC ............ F41G 7/22; F41G 9/002; F41G 3/02; G05D 1/12; B61L 27/0016

USPC ....... 701/207, 209, 420, 431, 465, 532, 533; 340/990
See application file for complete search history.

(56) References Cited

U.S. PATENT DOCUMENTS

| 5,293,308 | A | 3/1994 | Boys et al. |
| 5,508,917 | A | 4/1996 | Siegle et al. |
| 5,839,086 | A | 11/1998 | Hirano |
| 6,005,304 | A | 12/1999 | Seelig |
| 6,148,261 | A | 11/2000 | Obradovich et al. |
| 6,157,155 | A | 12/2000 | Kobayashi |

(Continued)

FOREIGN PATENT DOCUMENTS

| CA | 2 403 762 | 9/2002 |
| DE | 40 39 887 | 6/1992 |

(Continued)

OTHER PUBLICATIONS

WO 2005004079 A1_printed.*

(Continued)

*Primary Examiner* — Jelani Smith
(74) *Attorney, Agent, or Firm* — Andrews Kurth Kenyon LLP

(57) ABSTRACT

A navigation arrangement for a motor vehicle includes a first motor vehicle having a navigation system for ascertaining a suggested route for the first motor vehicle and at least one second motor vehicle having a navigation system for ascertaining a suggested route for the second motor vehicle, and an Internet connection being provided between the first motor vehicle and the second motor vehicle for transmitting information concerning the navigation system of the first motor vehicle from the first motor vehicle to the second motor vehicle.

13 Claims, 10 Drawing Sheets

(56) References Cited

U.S. PATENT DOCUMENTS

| | | | |
|---|---|---|---|
| 6,285,317 | B1 | 9/2001 | Ong |
| 6,324,467 | B1 | 11/2001 | Machii et al. |
| 6,336,073 | B1 | 1/2002 | Ihara et al. |
| 6,435,468 | B1 | 8/2002 | Simchoni |
| 6,647,270 | B1 | 11/2003 | Himmelstein |
| 6,700,504 | B1 * | 3/2004 | Aslandogan .......... G08G 1/087 340/901 |
| 6,707,378 | B2 | 3/2004 | MacNeille et al. |
| 6,745,111 | B2 | 6/2004 | Maruyama et al. |
| 6,765,495 | B1 | 7/2004 | Dunning et al. |
| 6,826,472 | B1 * | 11/2004 | Kamei et al. ................. 701/202 |
| 6,842,022 | B2 | 1/2005 | Khoche |
| 6,862,524 | B1 * | 3/2005 | Nagda et al. ................. 701/209 |
| 6,865,480 | B2 | 3/2005 | Wong |
| 6,868,331 | B2 | 3/2005 | Hanebrink |
| 6,898,516 | B2 | 5/2005 | Pechatnikov et al. |
| 6,965,829 | B2 | 11/2005 | Yamadaji et al. |
| 6,996,469 | B2 | 2/2006 | Lau et al. |
| 7,046,168 | B2 | 5/2006 | Tsuboi |
| 7,062,375 | B2 | 6/2006 | Hatano |
| 7,103,368 | B2 | 9/2006 | Teshima |
| 7,110,882 | B2 | 9/2006 | Moser et al. |
| 7,233,864 | B2 | 6/2007 | Moser et al. |
| 7,269,503 | B2 | 9/2007 | McGrath |
| 7,272,357 | B2 | 9/2007 | Nishiga et al. |
| 7,272,497 | B2 | 9/2007 | Koshiji et al. |
| 7,276,812 | B2 | 10/2007 | Uhl |
| 7,286,825 | B2 | 10/2007 | Shishido et al. |
| 7,383,123 | B2 | 6/2008 | Park |
| 7,492,247 | B2 | 2/2009 | Schmidt et al. |
| 2001/0019309 | A1 | 9/2001 | Saeki et al. |
| 2001/0020211 | A1 | 9/2001 | Takayama et al. |
| 2001/0020213 | A1 | 9/2001 | Hatano |
| 2002/0032035 | A1 | 3/2002 | Teshima |
| 2002/0045455 | A1 * | 4/2002 | Spratt ........................... 455/456 |
| 2002/0177948 | A1 | 11/2002 | Upparapalli et al. |
| 2003/0028314 | A1 | 2/2003 | Nagamune |
| 2003/0083809 | A1 | 5/2003 | Hatano |
| 2003/0102997 | A1 | 6/2003 | Levin et al. |
| 2003/0234720 | A1 | 12/2003 | MacNeille et al. |
| 2004/0015292 | A1 | 1/2004 | Wiio et al. |
| 2004/0064245 | A1 | 4/2004 | Knockeart et al. |
| 2004/0066330 | A1 | 4/2004 | Knockeart et al. |
| 2004/0082350 | A1 | 4/2004 | Chen et al. |
| 2004/0204848 | A1 | 10/2004 | Matsuo et al. |
| 2004/0230370 | A1 | 11/2004 | Tzamaloukas |
| 2004/0249565 | A1 | 12/2004 | Park |
| 2005/0065721 | A1 | 3/2005 | Herrtwich et al. |
| 2005/0197842 | A1 | 9/2005 | Bergmann et al. |
| 2005/0216147 | A1 | 9/2005 | Ferman |
| 2005/0222760 | A1 | 10/2005 | Cabral et al. |
| 2005/0248484 | A1 | 11/2005 | Stoschek et al. |
| 2005/0270311 | A1 | 12/2005 | Rasmussen et al. |
| 2006/0074549 | A1 | 4/2006 | Takahashi et al. |
| 2006/0074553 | A1 | 4/2006 | Foo et al. |
| 2006/0161341 | A1 * | 7/2006 | Haegebarth et al. ......... 701/209 |
| 2006/0164412 | A1 | 7/2006 | Dupont et al. |
| 2006/0200312 | A1 | 9/2006 | Osaka |
| 2007/0093958 | A1 | 4/2007 | Jonsson et al. |
| 2007/0115433 | A1 * | 5/2007 | Saso .................... G01C 21/362 352/8 |
| 2007/0138347 | A1 * | 6/2007 | Ehlers ........................ 246/1 R |
| 2007/0233369 | A1 | 10/2007 | Ng et al. |
| 2007/0233371 | A1 | 10/2007 | Stoschek et al. |
| 2007/0233375 | A1 | 10/2007 | Garg et al. |
| 2007/0233377 | A1 | 10/2007 | Salay et al. |
| 2007/0271035 | A1 | 11/2007 | Stoschek et al. |
| 2008/0133132 | A1 | 6/2008 | Jung et al. |
| 2008/0201070 | A1 | 8/2008 | Kikuchi |
| 2008/0249703 | A1 | 10/2008 | Matsuno et al. |

FOREIGN PATENT DOCUMENTS

| | | |
|---|---|---|
| DE | 44 46 779 | 6/1996 |
| DE | 100 14 954 | 10/2001 |
| DE | 100 53 373 | 5/2002 |
| DE | 101 12 892 | 10/2002 |
| DE | 103 39 940 | 4/2004 |
| DE | 698 15 940 | 6/2004 |
| DE | 103 12 792 | 8/2004 |
| DE | 103 12 284 | 10/2004 |
| DE | 103 38 852 | 3/2005 |
| DE | 103 49 242 | 4/2005 |
| DE | 103 44 144 | 5/2005 |
| DE | 10 2004 061 782 | 9/2005 |
| DE | 10 2005 013 648 | 9/2006 |
| EP | 0 243 635 | 1/1993 |
| EP | 0 694 895 | 1/1996 |
| EP | 0 875 730 | 11/1998 |
| EP | 1 033 692 | 9/2000 |
| EP | 1 035 531 | 9/2000 |
| EP | 1 168 286 | 1/2002 |
| EP | 1 376 059 | 1/2004 |
| EP | 0 990 119 | 11/2005 |
| EP | 1 757 904 | 2/2007 |
| EP | 1 681 663 B1 | 8/2007 |
| FR | 2 634 707 | 2/1990 |
| GB | 2 100 069 | 12/1982 |
| JP | 06 036186 | 2/1994 |
| JP | 10 241094 | 9/1998 |
| JP | 2000-357296 A | 12/2000 |
| JP | 2002-131065 | 5/2002 |
| JP | 2004-227162 | 8/2004 |
| JP | 2005-286557 A | 10/2005 |
| WO | 92/17929 | 10/1992 |
| WO | 98/59215 | 12/1998 |
| WO | WO 2005004079 A1 * | 1/2005 |
| WO | WO 2005/124280 | 12/2005 |

OTHER PUBLICATIONS

Periodical Autoconnect 2005, Vereinigte Motor-Verlage GmbH & Co. KG (United Motor publishing house, Inc.), Leuschnerstr. I, 70174 Stuttgart, Federal Republic of Germany, pp. 18 and 21.

Bleyer et al., "Car-to-Car Communication," p. 16-19, Apr. 2002. (Translated).

PCT International Search Report and Written Opinion, PCT International Application No. PCT/EP2007/001906, dated Jun. 14, 2007 (English-language translation provided).

PCT International Search Report and Written Opinion of the International Searching Authority, PCT International Patent Application No. PCT/EP2007/001904, dated Jun. 21, 2007, (English-language translation provided).

PCT International Search Report and Written Opinion of the International Searching Authority, PCT International Patent Application No. PCT/EP2007/001905, dated Sep. 12, 2007, (English-language translation provided).

International Search Report and Written Opinion, dated Nov. 17, 2008, issued in International Application No. PCT/EP2007/002423.

Office Action, U.S. Appl. No. 11/439,315, dated Aug. 30, 2010.

Office Action, U.S. Appl. No. 11/439,315, dated Dec. 7, 2010.

Office Action, U.S. Appl. No. 11/501,554, dated Oct. 13, 2010.

Pioneer Operation Manual, DVD Navigation Unit AVIC-90DVD, published by Pioneer Corporation 2002, cover page, pp. 21, 37-42, 57, 58, and 102.

International Preliminary Report on Patentability, issued in corresponding Int'l. Appln. No. PCT/EP2004/013280, filed Nov. 23, 2004.

Written Opinion, issued in corresponding Int'l. Appln. No. PCT/EP2004/013280, filed Nov. 23, 2004.

* cited by examiner

MOTOR VEHICLE AND NAVIGATION ARRANGEMENT FOR A MOTOR VEHICLE

CROSS-REFERENCE TO RELATED APPLICATIONS

The present application claims the benefit of U.S. Provisional Application Ser. No. 60/800,222, filed on May 11, 2006, which is expressly incorporated herein in its entirety by reference thereto.

The present application is a continuation-in-part of U.S. patent application Ser. No. 11/395,705, filed on Mar. 31, 2006 now abandoned, which is expressly incorporated herein in its entirety by reference thereto.

FIELD OF THE INVENTION

The present invention relates to a motor vehicle and a navigation arrangement for a motor vehicle.

BACKGROUND INFORMATION

European Published Patent Application No. 0 875 730 and German Published Patent Application No. 698 15 940 describe a map information display device for use in a vehicle navigation device having a data conversion device for recording points of map data according to a map from a viewpoint through a viewing line originating from the viewpoint and having an angle of depression with respect to the plane of the map, and for perspectively projecting the points of the map data onto a viewing plane, which is fixed perpendicularly to the viewing line and is a predefined distance from the viewpoint in order to generate map display data. This produces a bird's eye view of an surrounding area. A navigation system having a bird's eye view of a surrounding area is also described in French Published Patent Application No. 2 634 707 and in the periodical autoconnect 2005, Vereinigte Motor-Verlage GmbH & Co. KG [United Motor Publishing Houses, Inc.], Leuschnerstr. 1, 70174 Stuttgart, Germany, pages 18 and 21.

European Published Patent Application No. 0 990 119 describes a digital personal communication device having a processor, having a memory accessible to the processor, and having a display that is connected to the processor, the display displaying map information and a position of the digital personal communication device with respect to the map information, the map information including route points, i.e., coordinates, as instructed by the processor.

SUMMARY

Example embodiments of the present invention provide for improvements to navigation of a motor vehicle.

According to an example embodiment of the present invention, a motor vehicle includes an, e.g., wireless, Internet interface for receiving the position and/or a route of another, e.g., selected, motor vehicle, the motor vehicle including a display device for representing the position and/or the route of the, e.g., selected, other motor vehicle in one map representation. A route may include a setpoint route or a suggested route of a navigation system. The motor vehicle may include a computing device for receiving the position and/or a route of another, e.g., selected, motor vehicle via the Internet interface and for controlling the display device accordingly such that the latter is able to represent the position and/or the route of the, e.g., selected, other motor vehicle in the map representation.

A map display may include a map, a satellite image, a 3D graphical representation, etc. The map, the satellite image or the 3D graphical representation may be shown in an overhead view, a bird's eye view, a first-person view, etc.

A selected other motor vehicle may be an individual motor vehicle or a motor vehicle of a selected group of motor vehicles. A selected other motor vehicle may be a motor vehicle addressable by the motor vehicle.

The, e.g., selected, other motor vehicle may be identifiable on the basis of an IP address and/or an e-mail address.

The motor vehicle may additionally include a position-finding system for determining the position of the motor vehicle.

The display device may be able to display in the map representation the position of the motor vehicle and/or a suggested route for the motor vehicle at the same time as the position and/or route of the, e.g., selected, other motor vehicle.

The, e.g., wireless, Internet interface may be able to receive information about a point of interest selected by an operator of the, e.g., selected, other motor vehicle.

The display device may be able to display the information about the point of interest in the map representation. The display device may be able to display in the map representation the point of interest at the same time as the position and/or route of the, e.g., selected, other motor vehicle.

The motor vehicle may include an input device for selecting a point of interest. For this purpose, information concerning the point of interest may be transmittable via the, e.g., wireless, Internet interface.

The motor vehicle may additionally include an on-board navigation system for calculating a suggested route for the motor vehicle.

According to an example embodiment of the present invention, a motor vehicle—which may include one or several of the aforementioned features—includes a navigation system for ascertaining a suggested route for the motor vehicle, the motor vehicle including an, e.g., wireless, Internet interface for sending information concerning the navigation system to another motor vehicle or a navigation system of another motor vehicle. For sending information concerning the navigation system via the Internet interface, the motor vehicle may include a corresponding computing device. The latter may also be integrated in the navigation system.

Information concerning the navigation system may be, for example, a setpoint route or a suggested route, the position of the motor vehicle, information about a point of interest and/or another information associated with the navigation system, etc.

The information concerning the navigation system may be transmittable together with an IP address and/or an e-mail address.

The motor vehicle may additionally include a position-finding system for determining the position of the motor vehicle.

According to an example embodiment of the present invention, a navigation arrangement for a motor vehicle—which may include one or several of the aforementioned features—includes a first motor vehicle having a navigation system for ascertaining a suggested route for the first motor vehicle, at least one second motor vehicle having a navigation system for ascertaining a suggested route for the second motor vehicle and an, e.g., wireless, Internet connection between the first motor vehicle and the second motor vehicle for transmitting information concerning the navigation system of the first motor vehicle from the first motor vehicle to the second motor vehicle.

Information concerning the navigation system may be, for example, a setpoint route or a suggested route, the position of the motor vehicle, information about a point of interest and/or other information associated with the navigation system, etc.

The second motor vehicle may include a display device for representing in a map representation the position and/or the route of the first motor vehicle. A map representation may be a map, a satellite image, a 3D graphical representation, etc. The map, the satellite image or the 3D graphical representation may be shown in an overhead view, a bird's eye view, a first-person view, etc.

The navigation arrangement may furthermore include a server for receiving the information concerning the navigation system of the first motor vehicle from the first motor vehicle and for transmitting the information concerning the navigation system of the first motor vehicle to the second motor vehicle. There may be a provision for the server to be able to store the information concerning the navigation system of the first motor vehicle, and the second motor vehicle may be able to retrieve the information concerning the navigation system of the first motor vehicle stored with the aid of the server.

The navigation arrangement may furthermore include a server for receiving the information concerning the navigation system of the first motor vehicle from the first motor vehicle and for storing the information concerning the navigation system of the first motor vehicle. The second motor vehicle is able to retrieve the information concerning the navigation system of the first motor vehicle stored by the server.

In addition to the information concerning the navigation system of the first motor vehicle, traffic information and connectivity information may also be transmitted from the first motor vehicle to the server, which then makes this available to other motor vehicles. Traffic information may include, for example, information about traffic jams, road works, information about new roads, information about no longer existing roads, information about blocked roads, and/or information about new or canceled one-way streets, etc. Connectivity information in the aforementioned sense are in particular information about costs, availability, transmission rate and/or bandwidth etc. of a wireless internet connection option in a particular area.

A wireless communication connection may also include a non-wireless part. A wireless Internet connection may be, for example, a WLAN connection. There may be a provision for selecting (automatically) from among alternative wireless internet connections as a function of certain criteria. Examples of these criteria include cost, availability, transmission rate and/or bandwidth, etc.

According to an example embodiment of the present invention, a navigation arrangement (for a motor vehicle) includes an off-board navigation system, e.g., for calculating a suggested route for the second motor vehicle, which off-board navigation system is spatially separated from a first motor vehicle that, e.g., includes one or several of the aforementioned features and from a second motor vehicle that, e.g., includes one or several of the aforementioned features, the navigation arrangement including a wireless communication connection between the off-board navigation system and the first motor vehicle for transmitting the position of the second motor vehicle, and/or possibly of the suggested route for the second motor vehicle, to the first motor vehicle, and the first motor vehicle including a human-machine interface for outputting the position of the second motor vehicle, and/or possibly the suggested route for the second motor vehicle, to an operator of the first motor vehicle.

A wireless communication connection may also include a non-wireless part. A wireless communication connection may include, in particular, a communication connection that is wireless at least to the motor vehicle. A wireless communication connection may be, in particular, a wireless connection to the Internet (e.g., WLAN). Wireless communication connections may also be WIFI, WIMAX, RF, mobile radio, etc. There may be a provision for selecting (e.g., automatically) from among alternative wireless communication connections as a function of certain criteria. Examples of these criteria include cost, availability, transmission rate and/or bandwidth, etc.

The second motor vehicle may include a position-finding system for determining the position of the second motor vehicle.

The suggested route may be a function of the current traffic, road works, weather and environmental conditions and/or visibility, etc. The suggested route may also depend on personal preferences (interesting routes, landmarks, shopping areas, etc.).

A destination may be entered (e.g., via the human-machine interface). This destination may be transmittable to the off-board navigation system via the wireless communication connection. The destination may be entered alphanumerically, for example. Alternatively, or in addition, the destination may also be entered via voice input or character recognition (e.g., a character recognition for identifying Asian characters). A location may be selected on a map, a satellite image and/or a 3-D graphical representation, etc. A zoom function for the map, the satellite image, and/or the 3-D graphical representation, etc., may be provided. There may be a provision such that an operator of the motor vehicle can have a search conducted for a particular object (restaurant, landmark, store, gas station, etc.) in a particular area (road, city, postal code, district, etc.), and select a navigational destination from the offered hits (e.g. in a map, in a satellite image, and/or in a 3-D graphical representation). The starting point is the current position of the motor vehicle. However, the starting point may also be selectable.

The off-board navigation system may have the functionality of a search engine. This includes, for example:
  the option of searching online for points of interest (POIs) and locating these on a map, in a satellite image, and/or in a 3-D graphical representation;
  the option of searching for stores or restaurants and having a look at the selection or the menu;
  the option of searching for particular articles and finding stores in which they are offered;
  the option of storing the preferences, preferred locations, and/or preferred routes of a user; and/or
  the option of finding interesting routes.

Suitable hits may be put into the suggested route, possibly as destinations.

According to an example embodiment of the present invention, a method for supporting the navigation of a motor vehicle, e.g., one include one or several of the aforementioned features, having a navigation system, information concerning the navigation system of another motor vehicle being received and the information concerning the navigation system of the other motor vehicle being outputted to an operator of the motor vehicle. Information concerning the navigation system may be, for example, a setpoint route or a suggested route, the position of the motor vehicle, information about a point of interest and/or other information associated with the navigation system, etc. One The position of the motor vehicle may be determined.

A navigation arrangement for a motor vehicle—e.g., a motor vehicle including one or several of the above-mentioned features—includes: a first motor vehicle having a navigation system for ascertaining a suggested route for the first motor vehicle; a second motor vehicle having a navigation system for ascertaining a suggested route for the second motor vehicle; and at least one third motor vehicle and a communication connection between the first motor vehicle and the third motor vehicle and a communication connection between the third motor vehicle and the second motor vehicle for transmitting information concerning the navigation system of the first motor vehicle from the first motor vehicle to the second motor vehicle via the third motor vehicle.

Information concerning the navigation system may be, for example, a setpoint route or a suggested route, the position of the motor vehicle, information about a point of interest and/or other information associated with the navigation system, etc.

The second motor vehicle may include a display device for representing the position and/or the route of the first motor vehicle in a map representation. A map representation may be a map, a satellite image, a 3D graphical representation, etc. The map, the satellite image or the 3D graphical representation may be shown, for example, in an overhead view, a bird's eye view, a first-person view, etc.

According to an example embodiment of the present invention, a first motor vehicle—e.g., one including one or more of the aforementioned features—includes a navigation system for determining the position of the first motor vehicle and, e.g., for ascertaining a suggested route for the first motor vehicle, the navigation system being able to represent, in a map representation in the first motor vehicle, the position of the first motor vehicle together with the position of a selected other motor vehicle. A map representation may be a map, a satellite image, a 3D graphical representation, etc. The map, the satellite image or the 3D graphical representation may be shown, for example, in an overhead view, a bird's eye view, a first-person view, etc.

Points of interest may be points of interest within the usual meaning. Points of interest, however, may also be meeting points. Thus a meeting point may be exchanged between two motor vehicles, which may be selected as a destination point for a suggested route.

A motor vehicle may be, e.g., a land vehicle that may be used individually in road traffic. Motor vehicles are specifically not restricted to land vehicles having an internal combustion engine.

There may be, e.g., a provision for transmitting a position of a motor vehicle and/or a suggested route for a motor vehicle automatically and, e.g., periodically (e.g., at a fixed or variable time interval).

A destination point for a suggested route for a motor vehicle may also be the position of another motor vehicle.

According to an example embodiment of the present invention, a motor vehicle includes: a wireless Internet interface configured to receive at least one of (a) a position and (b) a route of another motor vehicle; and a display device configured to represent the at least one of (a) the position and (b) the route of the other motor vehicle in a map representation.

The other motor vehicle may include a selected motor vehicle.

The other motor vehicle may be identifiable in accordance with at least one of (a) an IP address and (b) an e-mail address.

The motor vehicle may include a position-finding system configured to determine the position of the motor vehicle.

The Internet interface may be configured to transmit the position of the motor vehicle.

The display device may be configured to display the position of the motor vehicle in the map representation at a same time as the at least one of (a) the position and (b) the route of the other motor vehicle.

The Internet interface may be configured to receive a suggested route for the motor vehicle.

The display device may be configured to display the suggested route for the motor vehicle in the map representation at a same time as the at least one of (a) the position and (b) the route of the other motor vehicle.

The Internet interface may be configured to receive information about a point of interest selected by an operator of the other motor vehicle.

The display device may be configured to display the information about the point of interest in the map representation.

The display device may be configured to display the point of interest in the map representation at a same time as the at least one of (a) the position and (b) the route of the other motor vehicle.

The motor vehicle may include an input device configured to select a point of interest.

The Internet interface may be configured to transmit information concerning the point of interest.

The motor vehicle may include an on-board navigation system configured to calculate a suggested route for the motor vehicle.

According to an example embodiment of the present invention, a motor vehicle includes: a navigation system configured to ascertain a suggested route for the motor vehicle; and a wireless Internet interface configured to transmit information concerning the navigation system to at least one of (a) another motor vehicle and (b) a navigation system of another motor vehicle.

The Internet interface may be configured to transmit information concerning the navigation system together with at least one of (a) an IP address and (b) an e-mail address.

The motor vehicle may include a position-finding system configured to determine a position of the motor vehicle.

The information concerning the navigation system may include the position of the motor vehicle.

The information concerning the navigation system may include at least one of (a) a suggested route and (b) information regarding a point of interest.

According to an example embodiment of the present invention, a navigation arrangement for a motor vehicle includes: a first motor vehicle having a navigation system configured to ascertain a suggested route for the first motor vehicle; at least one second motor vehicle having a navigation system configured to ascertain a suggested route for the second motor vehicle; and an Internet connection between the first motor vehicle and the second motor vehicle configured to transmit information concerning the navigation system of the first motor vehicle from the first motor vehicle to the second motor vehicle.

The second motor vehicle may include a display device configured to represent at least one of (a) a position and (b) a route of the first motor vehicle in a map representation.

The navigation arrangement may include a server configured to receive the information concerning the navigation system of the first motor vehicle from the first motor vehicle and to transmit the information concerning the navigation system of the first motor vehicle to the second motor vehicle.

The navigation arrangement may include a server configured to receive the information concerning the navigation system of the first motor vehicle from the first motor vehicle and to store the information concerning the navigation system of the first motor vehicle.

The second motor vehicle may be configured to retrieve the information concerning the navigation system of the first motor vehicle stored by the server.

According to an example embodiment of the present invention, a navigation arrangement for a motor vehicle includes: an off-board navigation system spatially separated from a first motor vehicle and from a second motor vehicle; a wireless communication connection between the off-board navigation system and the first motor vehicle configured to transmit a position of the second motor vehicle to the first motor vehicle; and a human-machine interface arranged in the first motor vehicle configured to output the position of the second motor vehicle to an operator of the first motor vehicle.

The second motor vehicle may include a position-finding system configured to determine the position of the second motor vehicle.

According to an example embodiment of the present invention, a navigation arrangement for a motor vehicle includes: an off-board navigation system spatially separated from a first motor vehicle and from a second motor vehicle configured to calculate a suggested route for the second motor vehicle; a wireless communication connection between the off-board navigation system and the first motor vehicle configured to transmit at least one of (a) a position of the second motor vehicle and (b) the suggested route for the second motor vehicle to the first motor vehicle; and a human-machine interface arranged in the first motor vehicle configured to output at least one of (a) the position of the second motor vehicle and (b) the suggested route for the second motor vehicle to an operator of the first motor vehicle.

According to an example embodiment of the present invention, a method for supporting navigation of a motor vehicle having a navigation system includes: receiving information concerning a navigation system of another motor vehicle; and outputting the information concerning the navigation system of the other motor vehicle to an operator of the motor vehicle.

The method may include determining a position of the motor vehicle.

According to an example embodiment of the present invention, a navigation arrangement for a motor vehicle includes: a first motor vehicle having a navigation system configured to ascertain a suggested route for the first motor vehicle; a second motor vehicle having a navigation system configured to ascertain a suggested route for the second motor vehicle; at least one third motor vehicle; and a communication connection between the first motor vehicle and the third motor vehicle and a communication connection between the third motor vehicle and the second motor vehicle configured to transmit information concerning the navigation system of the first motor vehicle from the first motor vehicle to the second motor vehicle via the third motor vehicle.

The second motor vehicle may include a display device configured to represent at least one of (a) a position and (b) a route of the first motor vehicle in a map representation.

According to an example embodiment of the present invention, a motor vehicle is configured as a second motor vehicle in a navigation arrangement, which includes: a first motor vehicle having a navigation system configured to ascertain a suggested route for the first motor vehicle; a second motor vehicle having a navigation system configured to ascertain a suggested route for the second motor vehicle; at least one third motor vehicle; and a communication connection between the first motor vehicle and the third motor vehicle and a communication connection between the third motor vehicle and the second motor vehicle configured to transmit information concerning the navigation system of the first motor vehicle from the first motor vehicle to the second motor vehicle via the third motor vehicle.

According to an example embodiment of the present invention, a motor vehicle is configured as a third motor vehicle in a navigation arrangement, which includes: a first motor vehicle having a navigation system configured to ascertain a suggested route for the first motor vehicle; a second motor vehicle having a navigation system configured to ascertain a suggested route for the second motor vehicle; at least one third motor vehicle; and a communication connection between the first motor vehicle and the third motor vehicle and a communication connection between the third motor vehicle and the second motor vehicle configured to transmit information concerning the navigation system of the first motor vehicle from the first motor vehicle to the second motor vehicle via the third motor vehicle.

Further features and aspects of example embodiments of the present invention are described in more detail below with reference to the appended Figures

DETAILED DESCRIPTION

Figure 1:
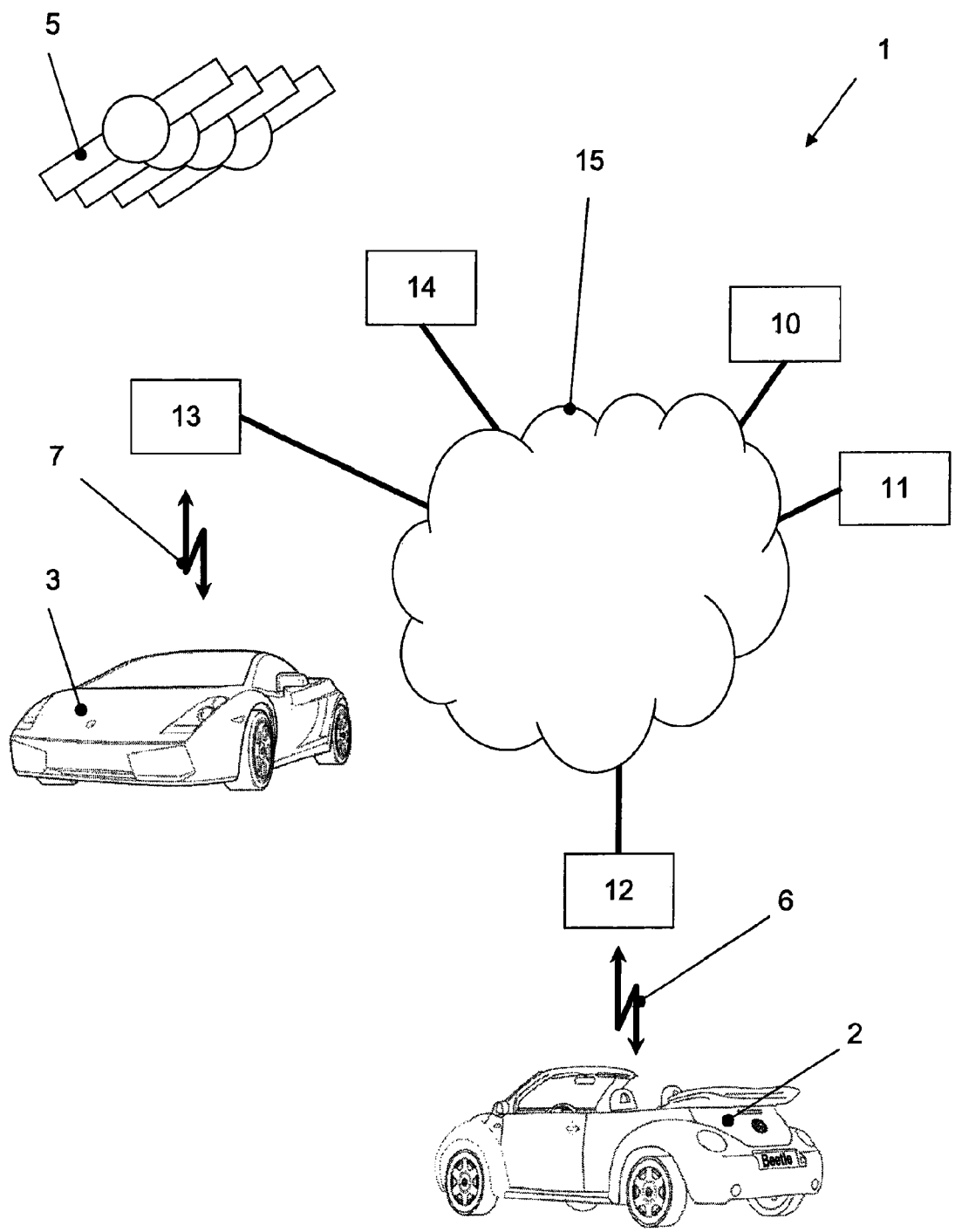
FIG. 1 illustrates an exemplary embodiment of a navigation arrangement for a motor vehicle.

FIG. 1 illustrates an exemplary embodiment of a navigation arrangement 1 for motor vehicles such as the motor vehicles indicated by reference numerals 2 and 3. Navigation arrangement 1 includes a server 10, which is spatially separate from motor vehicle 2 and motor vehicle 3 and has access to the Internet 15. Server 10 may be an exemplary embodiment for an off-board navigation system. For this purpose there may be a provision for server 10 to perform a calculation of a suggested route (setpoint route to a destination and/or setpoint direction of travel) for motor vehicle 2 or 3. Such a suggested route may be a function of current traffic, road works, weather and environmental conditions and/or visibility, etc. The suggested route may also depend on personal preferences (interesting routes, landmarks, shopping areas, etc.).

Navigation arrangement 1 includes a wireless Internet connection between motor vehicle 2 and motor vehicle 3 and, respectively, between server 10 and motor vehicles 2 and 3 for transmitting information concerning a navigation system of the respective motor vehicle 2 and 3 to server 10 and/or to another respective motor vehicle 3 or 2. Information within the aforementioned meaning concerning a navigation system of one of motor vehicles 2 and 3 may be, for example, a setpoint route or a suggested route, the position of the motor vehicle, information about a point of interest and/or other information associated with the navigation system.

In addition to information concerning a navigation system of one of motor vehicles 2 and 3, it is possible to transmit also traffic information and connectivity information to another respective motor vehicle 3 and 2 and/or to server 10, which then makes this information accessible to other motor vehicles 3 and 2, respectively. Traffic information may be, for example, information about traffic jams, road works, information about new roads, information about no longer existing roads, information about blocked roads and/or information about new or cancelled one-way streets, etc. Connectivity information may include, e.g., information about cost, availability, transmission rate and/or bandwidth, etc., of a wireless internet connection option in a certain area.

To implement the wireless internet connection, navigation arrangement 1 includes nodes 11, 12, 13, 14, which allow for wireless access to the internet 15. Wireless communication connection 6 and 7 may be arranged between nodes 11, 12, 13, 14 and motor vehicles 2 and 3, respectively. Wireless communication connection 6 and 7 is a WLAN, for example. There may also be a provision, however, to implement a wireless communication connection 6 or 7 as a WIFI connection, WIMAXI connection, RFI connection, mobile radio communication connection, etc. It may also be provided that a selection among alternative wireless communication connections be made (e.g., automatically) as a function of certain criteria. Examples of these criteria include cost, availability, and/or bandwidth, etc. Navigation arrangement 1 may also be used for instant messaging between motor vehicles. For this purpose, navigation arrangement 1 may include an instant messaging communication system, such as that described, e.g., in U.S. Patent Application Publication No. 2005/0197842 or German Published Patent Application No. 10 2004 061 782, each of which is expressly incorporated herein in its entirety by reference thereto. The data exchange within navigation arrangement 1 may be encrypted.

Figure 2:
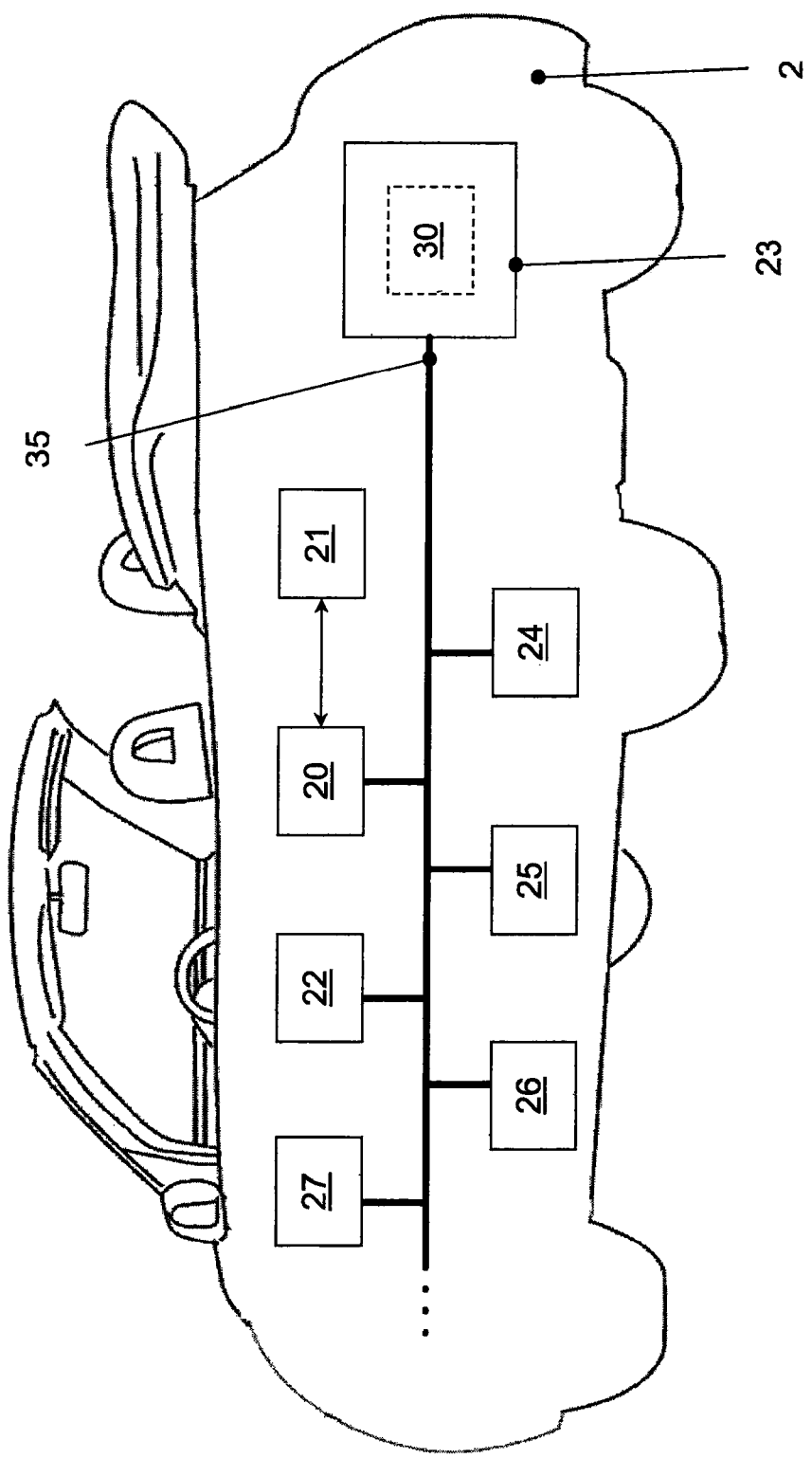
FIG. 2 is a schematic view of an exemplary embodiment of a motor vehicle having a navigation system.

FIG. 2 illustrates an exemplary embodiment of an exemplary implementation of motor vehicle 2 in a basic representation. Motor vehicle 3 may be arranged in an analogous manner. Motor vehicle 2 includes a human-machine interface in the form of a touch screen 21 for outputting the suggested route to an operator of motor vehicle 2. To this end, touch screen 21 is controllable via a display control unit 20, which is connected by a bus system 35 to an Internet interface 22 for wireless communication connection 6. Touch screen 21 may also be utilized for operating an infotainment system 24, a telephone 25, an automatic climate control 26, etc.

Motor vehicle 2 includes a position-finding system 30, integrated in the present exemplary embodiment into an onboard navigation system 23, for determining the position of motor vehicle 2, the orientation of motor vehicle 2 and/or the on-board time as a function of signals transmitted by satellites denoted by reference numeral 5 in FIG. 1. Using on-board navigation system 23, it is possible to ascertain a suggested route for motor vehicle 2 to a destination that can be entered via touch screen 21. The position of motor vehicle 2 and the suggested route as well as possibly points of interest can be transmitted via internet interface 22. Via touch screen 21, the position of motor vehicle 2, the suggested route and possibly points of interest can be additionally represented as integrated into a map, into a satellite image or a 3D graphical representation, etc. For this purpose, there may be a provision for an operator to be able to adjust the viewing angle (e.g. from an overhead view via a bird's eye view to a first-person view, and vice versa).

With regard to satellite images there may be a provision to be able to select between different modes such as night mode, day mode, seasonally dependent modes, weather-dependent modes, etc. There may also be a provision for a map, a satellite image and/or a 3D graphical representation to be complemented by information from on-board sensor system 27 (night vision, road condition sensor system).

An alternative or additional refinement may provide for the position of motor vehicle 2, the orientation of motor vehicle 2 and/or the on-board time as well as a destination entered via touch screen 21 to be transmittable via internet interface 22 to server 10, it also being possible for the position of motor vehicle 2 to be a variable from which the position of motor vehicle 2 can be ascertained such as, e.g., GPS signals received from motor vehicle 2. If, for example, the GPS signals received by the motor vehicle are transmitted to server 10, then the latter ascertains the position of motor vehicle 2 and the orientation of motor vehicle 2, and possibly the on-board time. According to the alternative or additional refinement, server 10 ascertains a suggested route as a function of the position of motor vehicle 2 and the entered destination and transmits it to motor vehicle 2 and/or to another motor vehicle 3 via wireless communication connection 6 and 7, respectively.

Figure 3:
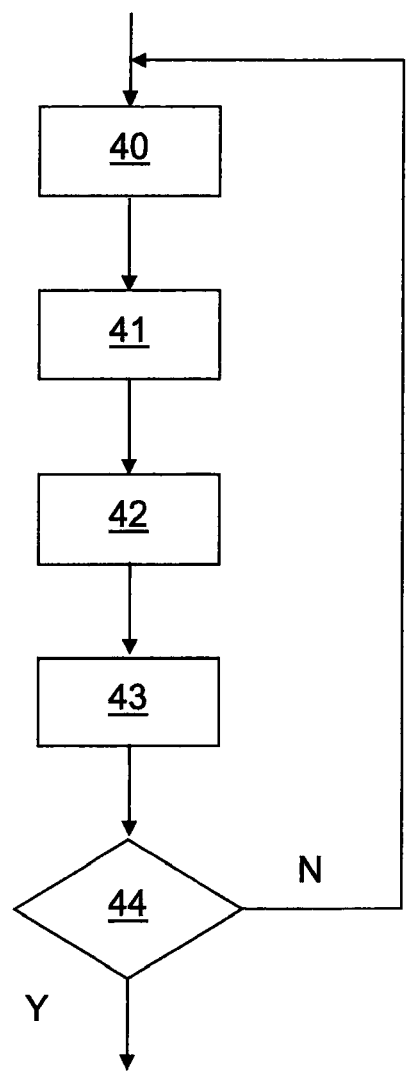
FIG. 3 illustrates an exemplary embodiment of a method for supporting the navigation of a motor vehicle.

FIG. 3 illustrates a simplified exemplary embodiment of a method for supporting the navigation of motor vehicle 2 and for operating navigation arrangement 1. The method begins with a step 40 in which the position of motor vehicle 2 as well as—if provided—a suggested route is ascertained. Step 40 is optionally followed by a step 41 in which the position of motor vehicle 2, the suggested route and/or points of interest are transmitted via internet interface 22. The transmission may occur to server 10 or to another selected motor vehicle or a motor vehicle of a selected group of motor vehicles. For this purpose, it is provided for another motor vehicle to be identifiable on the basis of an IP address and/or an e-mail address.

Step 40 or step 41 is followed by a step 42, in which the position of another motor vehicle such as motor vehicle 3, the suggested route of another motor vehicle such as motor vehicle 3 and/or points of interest transmitted by another motor vehicle such as motor vehicle 3 are received or are retrieved by server 10. It is also possible to receive or for server 10 to retrieve the positions of several other motor vehicles, suggested routes of several other motor vehicles and/or points of interest transmitted by several other motor vehicles. The retrievable information may be classified by the transmitting motor vehicle such that they are retrievable only by authorized users. If no internet connection exists at the moment, then steps 41 or 42 will be performed as soon as an internet connection exists again. It is possible to make the quantity and type of the data loaded in a step 42 a function of the availability of internet connections lying ahead of the motor vehicle or of their costs.

Figure 4:
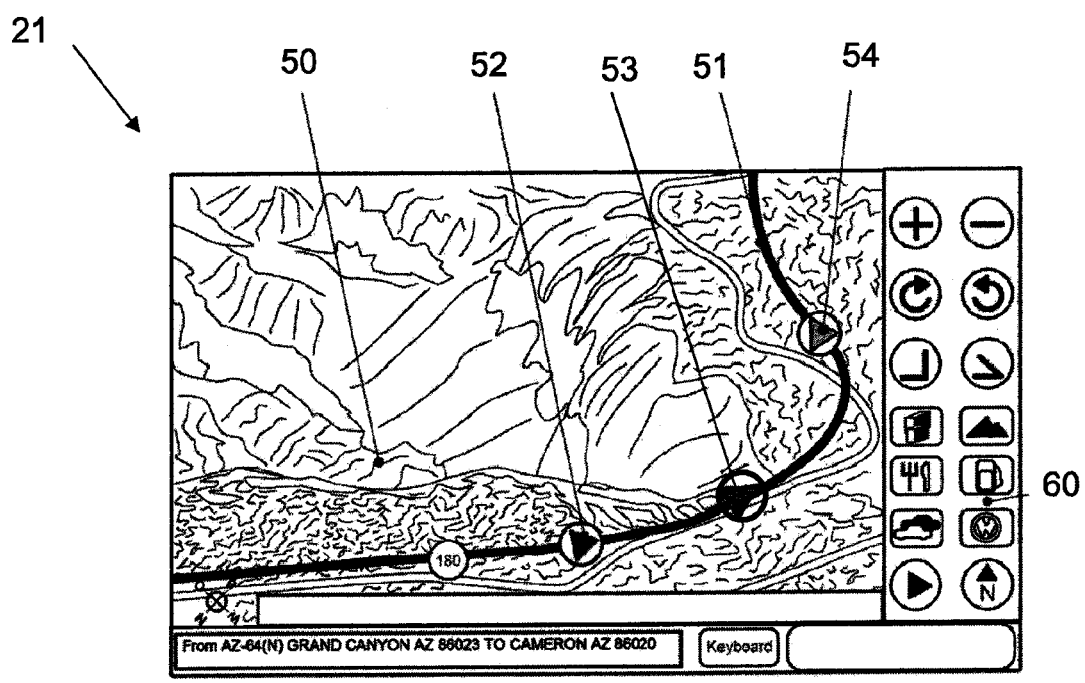
FIG. 4 illustrates an exemplary embodiment of a touch screen display of a route integrated into a satellite image.

Step 42 is followed by a step 43, in which—as shown in an exemplary manner in FIG. 4 on the basis of the position of other motor vehicles—the position of the other motor vehicle such as motor vehicle 3, possibly the suggested route of the other motor vehicle such as motor vehicle 3 and/or possibly points of interest transmitted by the other motor vehicle such as motor vehicle 3 are displayed via touch screen 21. For this purpose, in the exemplary embodiment illustrated in FIG. 4, the positions 53 and 54 of selected other motor vehicles are represented in a satellite image 50 in a bird's eye view together with position 52 of motor vehicle 2. In addition, a suggested route 51 for motor vehicle 2 is illustrated on touch screen 21. With this type of representation, it is also possible to drive in a convoy outside of the visual range. Step 43 is followed by query 44, as to whether the method should be terminated. If the method is not to be terminated, then query 44 is followed by step 40.

Next to the bird's eye view of satellite image 50, FIG. 4 shows a tool bar 60. With the aid of this tool bar 60—as described with reference to FIG. 7 and FIG. 8—the representation may be changed and/or other and/or additional functions may be activated or controlled. Thus, using tool bar 60, it is possible to change the bird's eye perspective of satellite image 50 selected in FIG. 4 into an overhead view.

Figure 5:
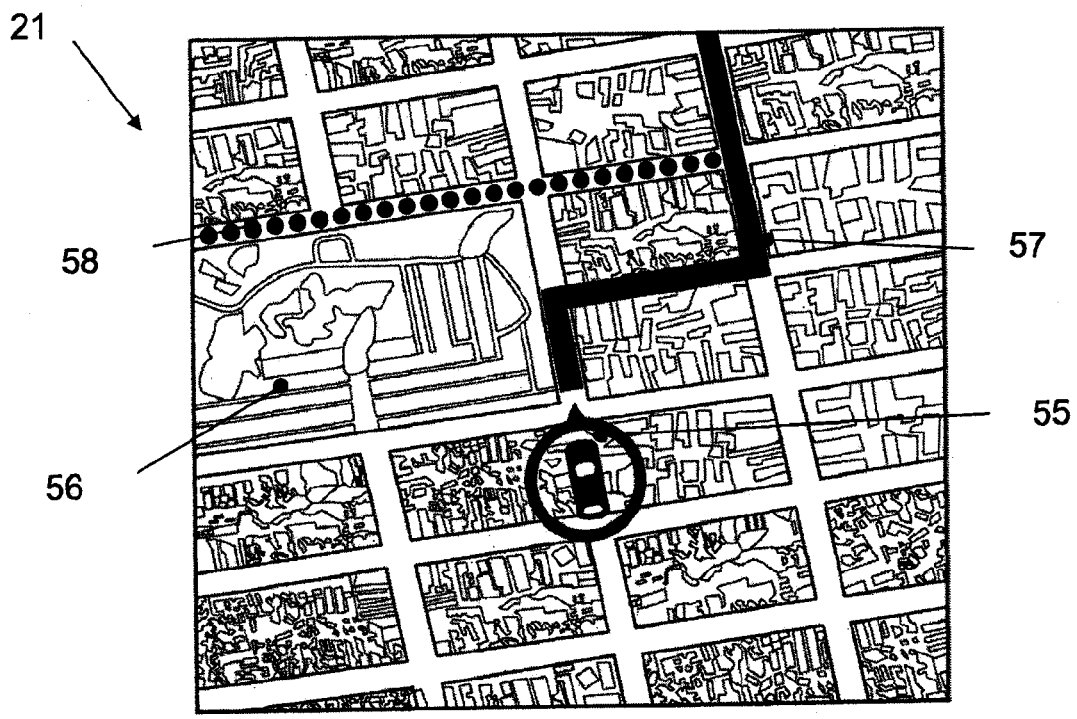
FIG. 5 illustrates an exemplary embodiment of a touch screen display of a route integrated into a satellite image.
Figure 6:
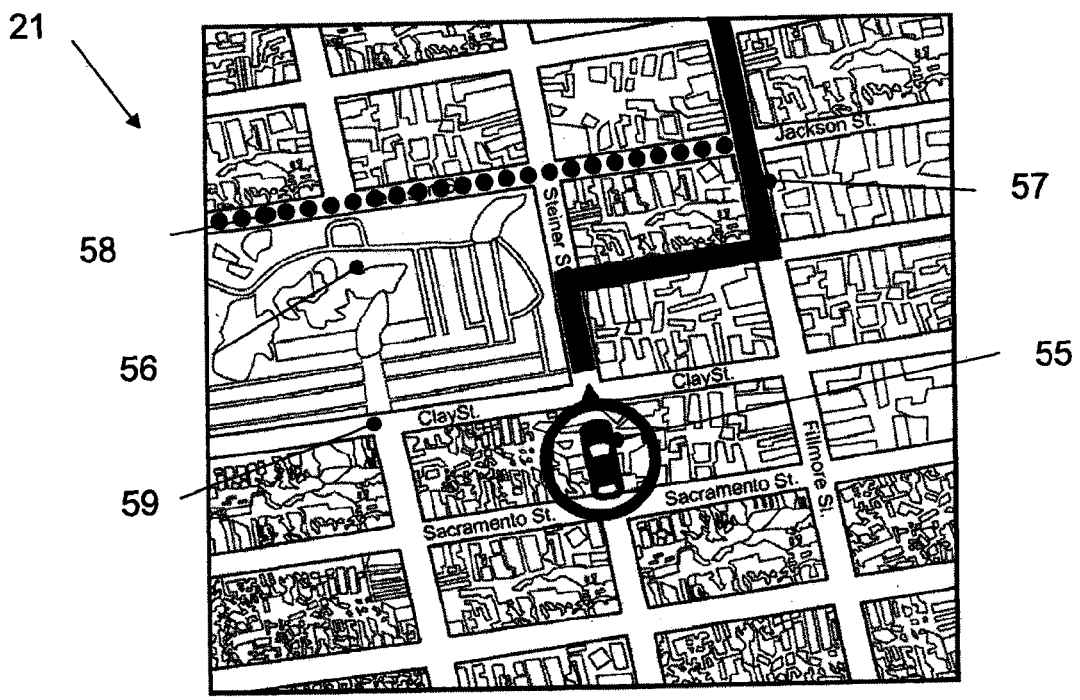
FIG. 6 illustrates an exemplary embodiment of a touch screen display of an overhead view of a route integrated into a 3D graphical representation.

FIG. 5 illustrates an exemplary embodiment of touch screen 21 in a situation in which a marking 55 for indicating the position of motor vehicle 2, a suggested route 57 for motor vehicle 2 and a suggested route 58 for motor vehicle 3 are represented together in a satellite image 56. FIG. 6 illustrates an exemplary embodiment of touch screen 21 in a situation in which marking 55 for indicating the position of motor vehicle 2, a suggested route 57 for motor vehicle 2, a suggested route 58 for motor vehicle 3 and names of streets 59 are represented together in a satellite image 56.

Figure 7:
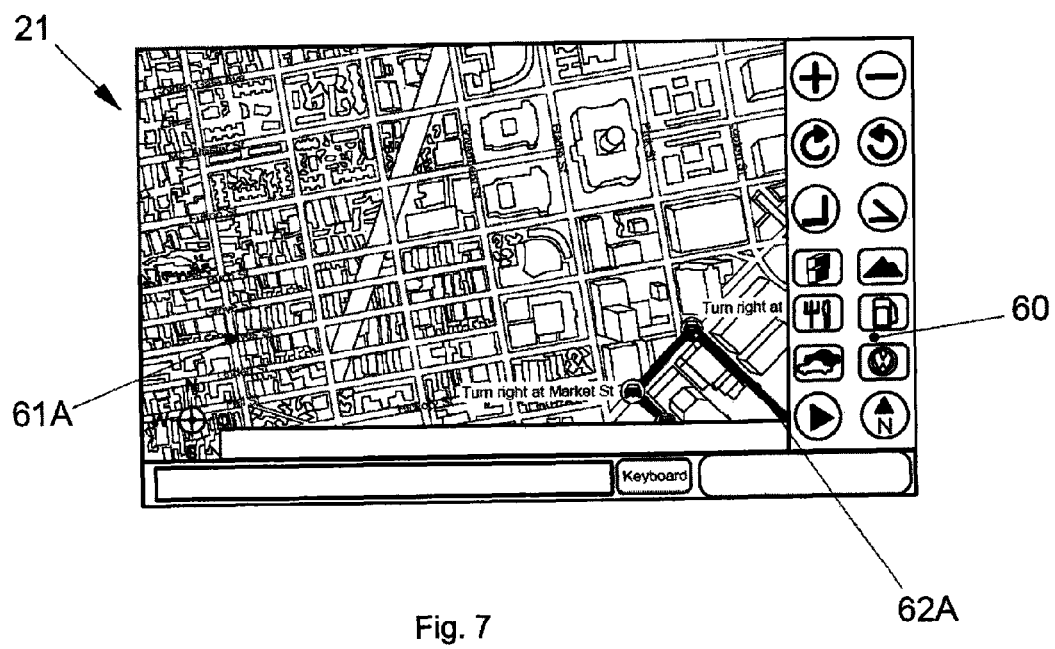
FIG. 7 illustrates an exemplary embodiment a touch screen display of a bird's eye view of a route integrated into a 3-D graphical representation.
Figure 8:
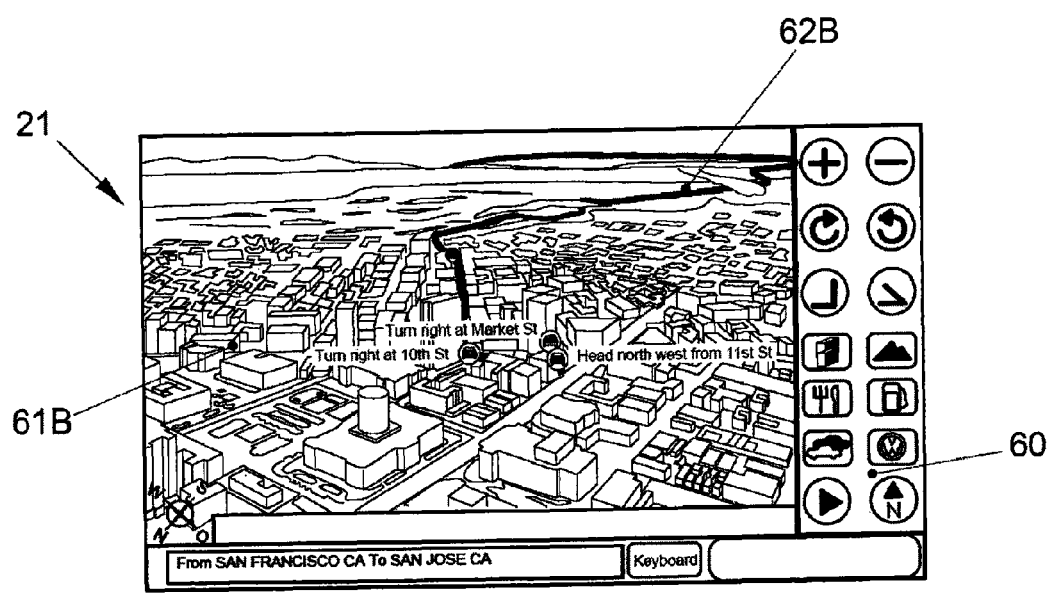
FIG. 8 illustrates an exemplary embodiment of a touch screen display of an input mask for entering a starting point and a destination.

FIG. 7 illustrates an exemplary embodiment of an overhead view 61A via touch screen 21 of a suggested route 62A integrated into a 3D graphical representation. In addition to overhead view 61A of the 3D graphical representation, tool bar 60 is displayed. With the aid of this tool bar 60, the display may be changed and/or other and/or additional functions may be activated or controlled. Thus tool bar 60 may be used to change overhead view 61A of the 3-D graphical representation, selected in FIG. 7, into a bird's eye view 61B, as illustrated in FIG. 8. Accordingly, suggested route 62B is displayed as integrated into the bird's eye view.

Figure 9:
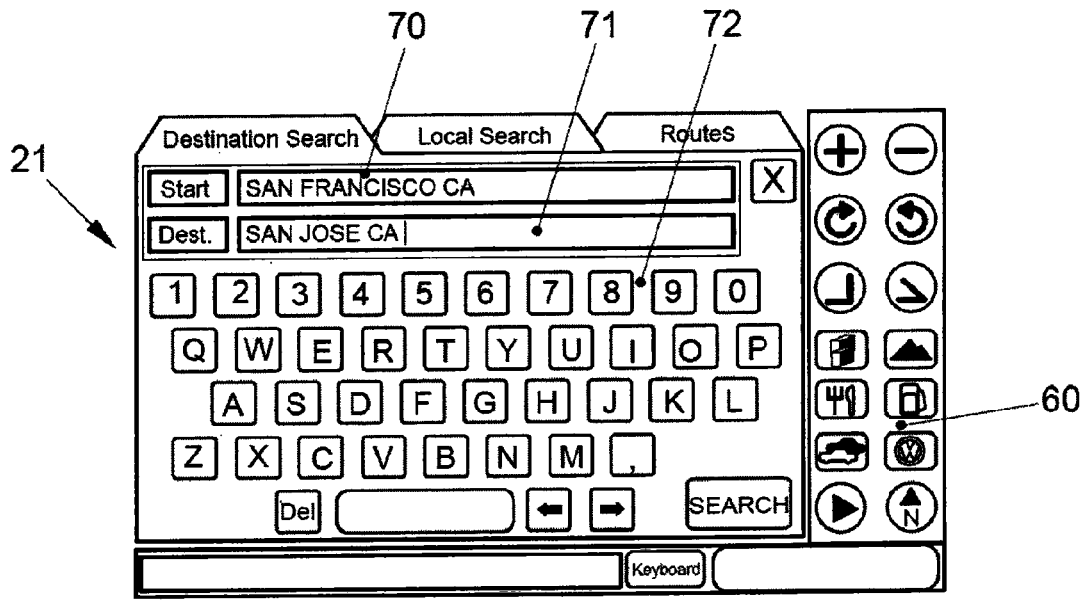
FIG. 9 illustrates an exemplary embodiment of a touch screen display of an input mask for selecting a destination.

FIG. 9 illustrates an exemplary embodiment of the display of an input mask for inputting a starting point and a destination with the aid of touch screen 21. To this end, the represented exemplary embodiment provides a starting-point input field 70 and a destination input field 71. The destination may be entered, for example, alphanumerically, using a displayed keyboard 72. Alternatively, or in addition, the destination may also be entered via voice input or character recognition (e.g., character recognition for identifying Asiatic characters). A location may be selected on a map, a satellite image and/or a 3D graphical representation. In this case, a zoom function for the map, the satellite image and/or the 3D graphical representation may be provided. The starting position may also be the current position of motor vehicle 2.

Figure 10:
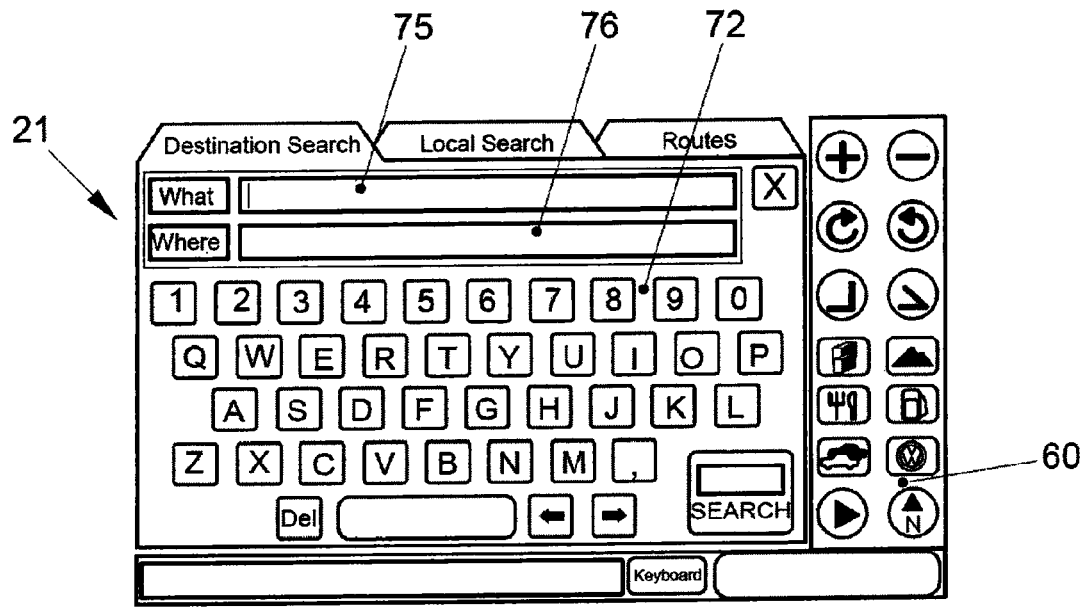
FIG. 10 illustrates an exemplary embodiment of a touch screen display for selecting preferred routes.

As illustrated in FIG. 10, there may also be a provision for an operator of motor vehicle 2 to be able to search for a particular object (restaurant, landmark, store, gas station, etc.) in a particular search area (street, city, postal code, district, etc.). To this end, an input mask having an object-input field 75 for inputting an object to be searched for (restaurant, landmark, store, gas station, etc.) and an area-input field 76 for inputting the search area (street, city, postal code, district, etc.) are displayed on touch screen 21. The operator may then select a hit from the hits ascertained (e.g. in a map, in a satellite image and/or in a 3D graphic representation, etc.) and offered with the aid of this search.

Figure 11:
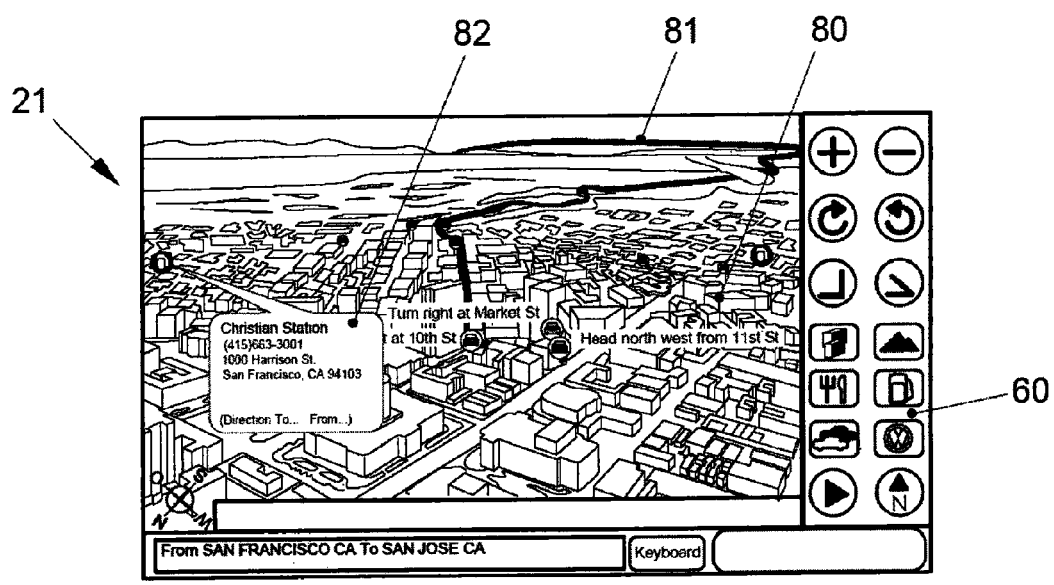
FIG. 11 illustrates an exemplary embodiment of a touch screen display of an overall view of a route.

If the destination is entered by voice input, then the voice input may be confirmed graphically 82, as illustrated in FIG. 11. As illustrated in FIG. 11, this graphic confirmation 82 may, for example, overlap a map display for a limited period of time. Thus the exemplary embodiment illustrated in FIG. 11 shows via touch screen 21, for example, a bird's eye view 80 of a suggested route 81 integrated into a 3D graphic representation.

Figure 12:
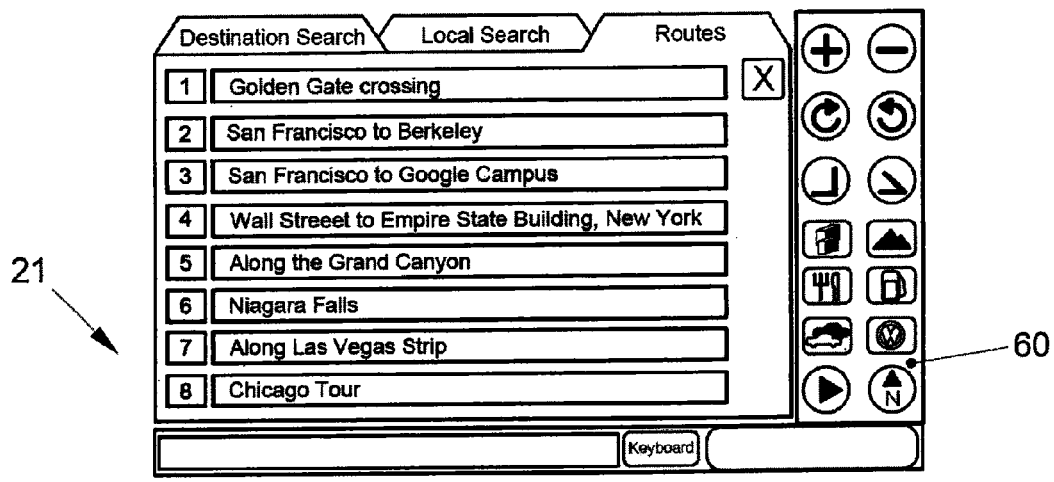
FIG. 12 illustrates an exemplary embodiment of a touch screen display for confirming a voice input.

There may also be a provision, however, for selecting preferred routes or certain touristically interesting routes. FIG. 12 illustrates an exemplary embodiment of a display for selecting preferred routes or certain touristically interesting routes using touch screen 21.

An automatic destination selection or at least an interactively automatic destination selection may also be provided under certain conditions. Thus, there may be a provision for motor vehicle 2 to send operational data of motor vehicle 2 (via wireless communication connection 7) or to transmit operational data of motor vehicle 2 (via wireless communication connection 7) to off-board navigation system 5. Operational information of the motor vehicle in this sense may be, for instance, the status of the fuel tank level, the oil level, or information about a defect, etc. If, for example, information that the tank is almost empty is transmitted, then navigation to the nearest gas station is offered and/or provided. If, for example, information that a specific defect is present is transmitted, then navigation to the nearest (suitable) service station is offered and/or provided.

Figure 13:
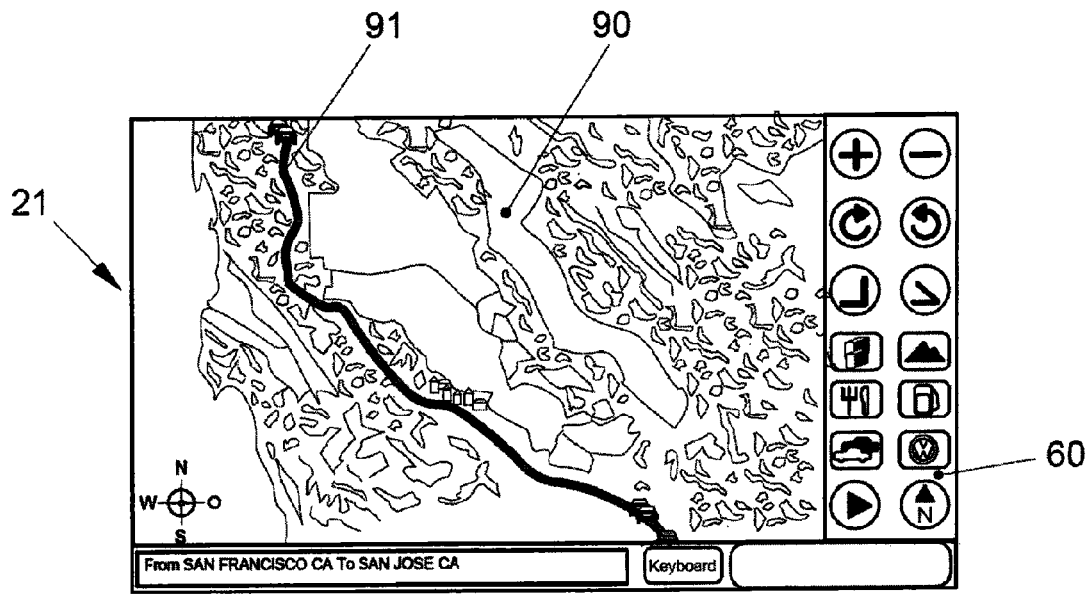
FIG. 13 illustrates an exemplary embodiment of a touch screen display of a satellite image supplemented by information.

FIG. 13 illustrates an exemplary embodiment of the display of an overall view of a route via touch screen 21. In this instance, reference numeral 90 denotes a satellite image and reference numeral 91 denotes a suggested route. The overall view of the route may also be implemented in a fly-through mode, e.g., from a bird's eye view. For this purpose there may be a provision for breaking off the fly-through mode if touch screen 21 is touched.

Figure 14:
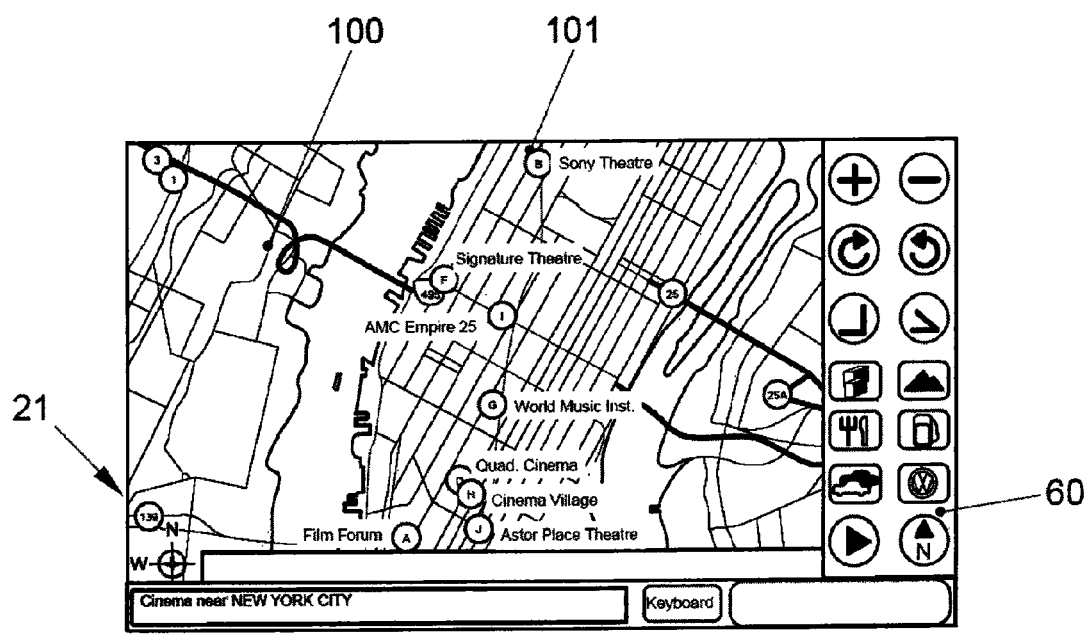
FIG. 14 illustrates an exemplary embodiment of detail of a display of a suggested route together with a follow-me function.

As illustrated in FIG. 14, satellite images 100 may also be superposed by or supplemented with additional information 101 such as streets, street names or designations, buildings, vehicles, traffic information, (optionally customized), POIs, call-out boxes, service areas, images, etc., which are transmitted, for example, from another motor vehicle to motor vehicle 2 or retrieved by server 10. There may also be a provision for motor vehicle 2 to transmit the aforementioned information to another motor vehicle. Special references to rest areas or parking areas may be provided, for example, when a specific driving time has been exceeded.

Navigation arrangement 1 may also be used in combination with an off-road navigation system.

A navigation arrangement—such as explained below with reference to FIG. 15—may also be provided on the basis of a vehicle-vehicle or car-to-car communication. A vehicle-vehicle communication or car-to-car communication manages, e.g., to do without stationary communication nodes. It is also possible, however, to communicate with fixed nodes or immobile network nodes (e.g., intelligent traffic lights or intelligent traffic signs, etc.). Details of a vehicle-vehicle communication without stationary communication nodes are described, for example, from the article "Car-to-Car Communication," by M. Bleyer, S. Waldenmaier, Funkschau April 2002, p. 16 to 19. A particularly suitable system for vehicle-vehicle communication or car-to-car communication as a basis for the navigation arrangement presented in the following with reference to FIG. 15 is described, for example, in German Published Patent Application No. 10 2005 013 648, which is expressly incorporated herein in its entirety by reference thereto.

Figure 15:
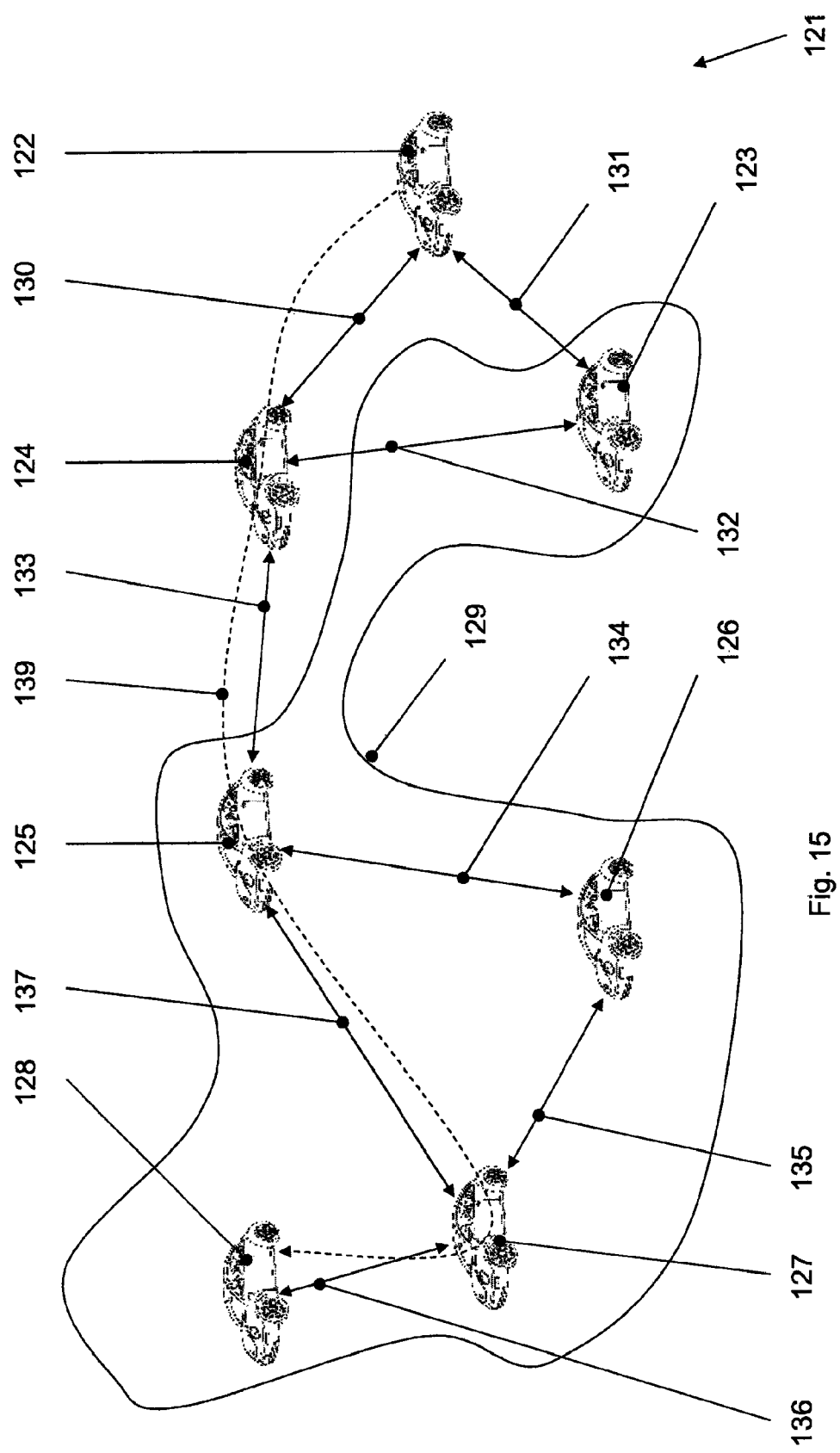
FIG. 15 illustrates an exemplary embodiment of a navigation arrangement for a motor vehicle.

FIG. 15 illustrates a navigation arrangement 121 including a plurality of motor vehicles 122, 123, 124, 125, 126, 127, 128 for vehicle-vehicle or car-to-car communication, which manages to do without stationary communication nodes. There may also be a provision, however, to integrate stationary communication nodes or immobile network nodes into navigation arrangement 121 in the same manner as one of the motor vehicles 122, 123, 124, 125, 126, 127, 128. Thus a provision is possible, for example, such that reference numeral 125 designates a stationary communication node or immobile network node on a pass between two valleys, motor vehicles 122, 123, 124 being in a first valley and motor vehicles 126, 127, 128 in a second valley.

Motor vehicles 122, 123, 124, 125, 126, 127, 128 of navigation arrangement 121 have a limited transmission and reception range such that, for example, motor vehicle 122 is able to communicate directly only with motor vehicle 123 and motor vehicle 124, but not with motor vehicles 125, 126, 127, 128. Double arrows 130, 131, 132, 133, 134, 135, 136, 137 indicate which motor vehicles 122, 123, 124, 125, 126, 127, 128 are able to communicate directly with each other.

With the aid of navigation arrangement 121, it is possible to send (e.g., automatically) information concerning the navigation system of motor vehicle 122 such as a suggested route for motor vehicle 122, the position of motor vehicle 122 and/or information about a point of interest from motor vehicle 122 to motor vehicle 128. For this purpose, the information concerning the navigation system of motor vehicle 122 is routed by a forwarding/routing method via motor vehicles 124, 125 and 127 of navigation arrangement 121 to motor vehicle 128, as symbolized by dashed arrow 139. The information concerning the navigation system of motor vehicle 122 can then be displayed by the display device of motor vehicle 128.

A hybrid system made up of navigation arrangement 1 and navigation arrangement 121 may also be provided, in which, for example, only motor vehicles 125, 126, 127, 128 have Internet access in a defined area 129. Thus, for example, information concerning the navigation system of motor vehicle 123 may be transmitted to motor vehicle 128 according to a method described with reference to FIG. 1 and FIG. 3 or alternatively according to a method described with reference to FIG. 15.

LIST OF REFERENCE CHARACTERS

| | |
|---|---|
| 1, 121 | navigation arrangement |
| 2, 3, 122, 123, 124, 125, 126, 127, 128 | motor vehicle |
| 5 | satellite |
| 6, 7 | wireless communication connection |
| 10 | server |
| 11, 12, 13, 14 | node |
| 15 | internet |
| 20 | display control |
| 21 | touch screen |
| 22 | interface |
| 23 | on-board navigation system |
| 24 | infotainment system |
| 25 | telephone |
| 26 | automatic climate control |
| 27 | on-board sensor system |
| 28 | memory |
| 30 | position-finding system |
| 35 | bus system |
| 40, 41, 42, 43 | step |
| 44 | query |
| 50 | satellite image |
| 51 | suggested route |
| 52 | position of a motor vehicle |
| 53, 54 | positions of selected other motor vehicles |
| 55 | marking |
| 56, 90, 100 | satellite image |
| 59 | streets |
| 60 | tool bar |
| 61A | overhead view |
| 61B, 80 | bird's eye view |
| 57, 58, 62A, 62B, 81, 91, 111 | suggested route |
| 63 | points of interest |
| 70 | starting-point input field |
| 71 | destination input field |
| 72 | keyboard |
| 75 | object input field |
| 76 | area input field |
| 82 | graphic confirmation |
| 101 | additional information |
| 129 | area |
| 130, 131, 132, 133, 134, 135, 136, 137 | double arrow |
| 139 | dashed arrow |

What is claimed is:

1. A motor vehicle, comprising:
   a wireless Internet interface that receives a position, a suggested route of another motor vehicle, and a plurality of points of interest selected by an operator of the another motor vehicle, wherein the suggested route of the another motor vehicle is different from a route of the motor vehicle; and
   a display device that simultaneously displays (a) the position and the suggested route of the another motor vehicle and (b) the route of the motor vehicle in a map representation and displays the plurality of points of interest in the map representation,
   wherein the suggested route is a route to a current or future destination.

2. The motor vehicle according to claim 1, wherein the another motor vehicle includes a selected motor vehicle.

3. The motor vehicle according to claim 1, wherein the another motor vehicle is identifiable in accordance with at least one of (a) an IP address and (b) an e-mail address.

4. The motor vehicle according to claim 1, further comprising a position-finding system configured to determine the position of the motor vehicle.

5. The motor vehicle according to claim 4, wherein the Internet interface is configured to transmit the position of the motor vehicle.

6. The motor vehicle according to claim 4, wherein the display device is configured to display the position of the motor vehicle in the map representation at a same time as at least one of (a) the position and (b) the suggested route of the another motor vehicle.

7. The motor vehicle according to claim 4, wherein the Internet interface is configured to receive a suggested route for the motor vehicle.

8. The motor vehicle according to claim 7, wherein the display device is configured to display the suggested route for the motor vehicle in the map representation at a same time as at least one of (a) the position and (b) the suggested route of the another motor vehicle.

9. The motor vehicle according to claim 1, wherein the display device is configured to display the point of interest in the map representation at a same time as at least one of (a) the position and (b) the suggested route of the another motor vehicle.

10. The motor vehicle according to claim 1, further comprising an input device configured to select a point of interest.

11. The motor vehicle according to claim 10, wherein the Internet interface is configured to transmit information concerning the point of interest.

12. The motor vehicle according to claim 1, further comprising an on-board navigation system configured to calculate a suggested route for the motor vehicle.

13. The motor vehicle according to claim 1, wherein at least one point on the suggested route of the another motor vehicle is not a point on a route of the motor vehicle.

* * * * *